United States Patent [19]

Harper et al.

[11] 4,092,074
[45] May 30, 1978

[54] RADIATOR GUARD HINGE PIN

[75] Inventors: Robert W. Harper, Metamora; Robert L. Shelby, Chillicothe, both of Ill.

[73] Assignee: Caterpillar Tractor Co., Peoria, Ill.

[21] Appl. No.: 814,373

[22] Filed: Jul. 11, 1977

[51] Int. Cl.² ............................................. F16C 11/10
[52] U.S. Cl. ....................................... 403/24; 403/154; 403/157; 403/316
[58] Field of Search ................ 292/150, 149; 403/154, 403/155, 157, 316, 317, 383, 24

[56] References Cited

U.S. PATENT DOCUMENTS

| 3,419,298 | 12/1968 | Worley | 403/24 |
|---|---|---|---|
| 3,897,162 | 7/1975 | Havark | 403/316 X |
| 3,910,709 | 10/1975 | Krekeler | 403/317 |
| 3,911,510 | 10/1975 | Bryant | 403/315 X |

Primary Examiner—Werner H. Schroeder
Assistant Examiner—Conrad L. Berman
Attorney, Agent, or Firm—Wegner, Stellman, McCord, Wiles & Wood

[57] ABSTRACT

Structure for removably locking a cover in a covering disposition. The locking device is arranged to be released notwithstanding the disposition thereof in a relatively inaccessible area of the machine on which the cover is mounted. The locking device includes a locking pin which is axially movable so as to have clearance with the cover with the pin being so moved by a tool inserted through the small access space available to the locking device. The pin is drawn back outwardly into locking arrangement with the cover by a threaded device having a shank portion passed through a hole in the cover into threaded association with the locking pin, permitting threaded operation of the device to draw the pin outwardly into the hole of the cover and thereby lock the cover against rotation about a pivot mount thereof.

12 Claims, 4 Drawing Figures

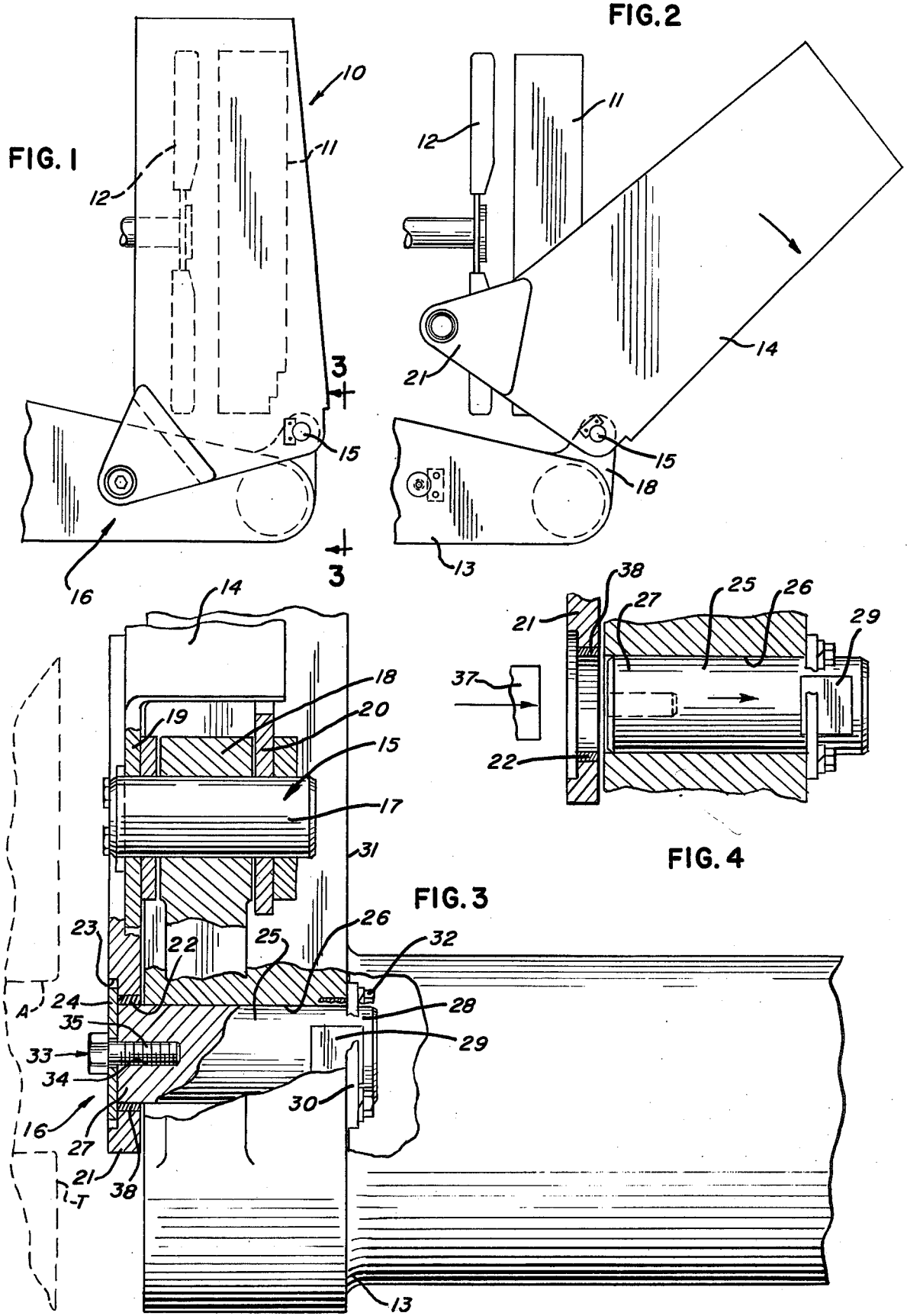

RADIATOR GUARD HINGE PIN

BACKGROUND OF THE INVENTION

1. Field of the Invention

This invention relates to protective devices and in particular to means for locking a cover guard removably about a device such as the radiator of a tractor vehicle.

2. Description of the Prior Art

In vehicles such as tractor vehicles, it is common to utilize a radiator for effecting a heat transfer to coolant fluids used in the operation of the vehicle. It is further common in tractor vehicles to provide a guard to protect the radiator against flying debris and rocks during use of the tractor where the tractor is used in earthmoving operations and the like. Such guards are mounted to the frame of the tractor and when servicing of the radiator or fan is required, removal of the guards is effected to provide access to the radiator, etc.

A number of devices have been developed for mounting such radiator guards to the frame of the vehicle. A problem has arisen, however, in the prior art guards in that the means for locking the guard in the radiator covering disposition is relatively inaccessible and difficult to manipulate. This problem is aggravated in material handling vehicles, such as tractors, where the track means is conventionally disposed alongside the frame portion whereat the guard is locked.

SUMMARY OF THE INVENTION

The present invention comprehends an improved means for locking a cover or guard, such as the radiator guard of a tractor vehicle machine, in a covering disposition relative to the radiator thereof.

In the illustrated embodiment, the cover is pivotally mounted to one portion of the frame of the vehicle and an improved means for locking the cover in the radiator covering disposition is provided for selectively preventing pivoting of the cover on the pivot means. The invention comprehends a novel arrangement of the locking means permitting manipulation thereof both to lock the cover and to release the cover notwithstanding the disposition of the locking means in a relatively inaccessible position behind the track means of the vehicle.

More specifically, the invention comprehends providing in a machine having a support, a cover, and mounting means movably mounting the cover to the support for selective disposition in a covering position overlying the support and an exposing position, an improved locking means for releasably locking the support in the covering position including a locking pin defining inner and outer ends, means on the support defining a hole axially movably receiving the locking pin, means on the cover defining an opening aligned with the hole when the cover is in the covering position, positioning means carried by the support for selectively urging the locking pin axially outwardly to dispose the locking pin outer end in the opening while maintaining the locking pin inner end in the hole to prevent movement of the cover from the covering position, the outer end of the pin being accessible through the opening upon removal of the positioning means to permit urging of the locking pin axially inwardly to dispose the inner end inwardly of the cover thereby freeing the cover for movement on the mounting means to the exposing position.

As indicated above, the mounting means may comprise pivot means for swingably mounting the cover to the support.

The positioning means may comprise a bolt and washer with the shank of the bolt threaded into an axial recess in the outer end of the locking pin and with the washer received in a counterbore in the cover. The outer end of the pin may be removably received in the inner portion of the counterbore of the cover in the locking disposition of the device. The outer end of the locking pin is brought to this disposition by the action of the threaded means pulling the locking pin outwardly as an incident of threaded rotation of the bolt with the head thereof bearing against the washer retained to the cover in the counterbore.

The invention further comprehends providing means for preventing rotation of the locking pin about its longitudinal axis as a result of the threading and unthreading of the bolt relative to the locking pin. More specifically, the invention comprehends providing a flat on the inner end of the locking pin and means mounted to the frame adjacent thereto for engaging the flat and effectively preventing rotation of the locking pin while permitting axial movement thereof between the locking and unlocking dispositions.

Thus, the cover locking means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a portion of a machine having a cover removably secured in a covering disposition by a locking means embodying the invention;

FIG. 2 is a side elevation illustrating the disposition of the cover in a radiator-exposing position;

FIG. 3 is a fragmentary enlarged end view with portions broken away taken substantially along the line 3—3 of FIG. 1 illustrating the construction of the cover locking means; and FIG. 4 is a fragmentary section of a portion of the structure illustrated in FIG. 3 showing the arrangement of the locking means in the cover-released position.

DESCRIPTION OF THE PREFERRED EMBODIMENTS

In the illustrative embodiment of the invention as disclosed in the drawing, a vehicle structure generally designated 10 is shown to include a radiator and an associated cooling fan 12 which may be suitably mounted in the vehicle adjacent a support frame 13.

As shown in FIG. 1, the radiator and guard are removably enclosed, or covered, by a radiator guard, or cover, 14 which is swingably mounted to the frame 13 by a pivot 15 carried on an upstanding flange 18 thereof.

The cover is locked in the radiator covering disposition of FIG. 1 by an improved locking means 16 embodying the invention.

The pivot means, as more fully shown in FIG. 3, includes a pivot pin 17 which passes through the flange 18 so as to have the opposite ends of the pivot pin carry the cover in a pair of spaced wall portions 19 and 20 thereof.

As further shown in FIG. 3, the locking means 16 includes a mounting plate 21 secured to the lower rear corner of the radiator guard cover 14. The mounting plate is provided with a counterbored opening 22 defining a large outer recess portion 23 receiving a washer 24.

A locking pin 25 is axially slidably received in a through bore 26 in the support 13 with the outer end 27 of the locking pin being disposed inwardly adjacent washer 24 and the inner end 28 of the locking pin extending to inwardly of the support 13.

The inner end 28 of the locking pin is provided with a flatted surface 29 which cooperates with a keeper plate 30 secured to the rear surface of the frame 13 by suitable bolts 32 to prevent rotation of the locking pin 25 while permitting axial movement thereof between the cover locking position of FIG. 3 and the cover-released position of FIG. 4.

As further shown in FIG. 3, a positioning means 33 is further provided for adjusting the axial position of the locking pin 25 to the locking disposition shown in FIG. 3. More specifically, the positioning means comprises a bolt having a head portion 34 and a shank portion 35. Shank portion 35 extends through washer 24 into a threaded recess 36 opening coaxially outwardly through the outer end 27 of the locking pin.

In the locked arrangement of locking means 16, bolt 33 secures the washer 24 in the counterbore portion 23 with the outer end 27 of the locking pin drawn by the bolt outwardly into the opening 22 from the support bore 26, thereby locking the radiator guard against movement from the covering position of FIG. 1.

The outward urging of the locking pin by the bolt 33 may be effected through the relatively small access opening A of the adjacent track T so as to permit facilitated locking of the cover in the covering disposition of FIG. 1.

When it is desired to swing the cover to the uncovering arrangement of FIG. 2 as for servicing the radiator 11, the user need merely remove the bolt 33 and washer 24 by simple unthreading of the bolt through the access opening A. Thus, as shown in FIG. 4, opening 22 of the cover plate 21 provides free access to the outer end 27 of locking pin 25 as the result of the removal of bolt 33 and washer 24. This free access permits the user to insert a suitable presser tool, such as presser tool 37 shown fragmentarily in FIG. 4, through the opening and against the outer end 27 of the locking pin to urge the locking pin axially inwardly so as to bring the outer end 27 inwardly from the cover plate opening 22 so as to permit the desired swinging movement of the cover on pivot 15 as illustrated in FIG. 2. As shown in FIG. 4, the locking pin may be moved sufficiently inwardly by the tool 37 so as to dispose the outer end 27 fully within the support bore 26 to preclude interference between the locking pin and the cover portion 21 in the released arrangement.

As further shown in FIG. 4, the flatted surface 29 extends sufficiently axially to accommodate the keeper plate 30 in the extreme innermost disposition of the locking pin.

When it is desired to resecure the radiator guard cover 14 in the covering disposition of FIG. 1, the user need merely swing the cover back to the covering position and pass bolt 33 with washer 24 carried thereby through access opening A so as to thread shank portion 35 of the bolt into the threaded recess 34 of the locking pin. Washer 24 is disposed within the counterbore recess 23 by the action of the bolt head 34 thereagainst when the shank 35 is being threaded into the recess 36 while concurrently the locking pin 25 is drawn axially outwardly from the released disposition of FIG. 4 back to the locking disposition of FIG. 3 wherein the outer portion 27 is again received within the opening 22 of the cover plate 21.

Thus, the invention comprehends the facilitated selective positioning of the locking pin 25 by the simple threading and unthreading of the bolt 33 which may be relatively easily effected notwithstanding the relative inaccessibility of the locking means inwardly of the track T.

As shown in FIGS. 3 and 4, opening 22 may be provided with a suitable washer 38.

Thus, the invention comprehends an improved means for locking a cover to a support, such as a radiator guard, to a support portion of a vehicle for providing controlled access to apparatus, such as the radiator of the vehicle. The locking means is arranged so as to selectively dispose a locking pin in locking and released positions without requiring the removal of the pin from the support by merely repositioning the pin. The repositioning means is arranged to be operated with minimum accessibility thereto.

The foregoing disclosure of specific embodiments is illustrative of the broad inventive concepts comprehended by the invention.

The embodiments of the invention in which an exclusive property or privilege is claimed are defined as follows:

1. In a machine having a support, a cover, and mounting means movably mounting the cover to the support for selective disposition in a covering position overlying said support and an exposing position, improved means for releasably locking the cover to the support in said covering position comprising:

a locking pin defining inner and outer ends;
   means on said support defining a hole axially movably receiving said locking pin;
   means on said cover defining an opening aligned with said hole when said cover is in said covering position; and
   positioning means carried by said support for selectively urging said locking pin axially outwardly to dispose said locking pin outer end in said opening while maintaining said locking pin inner end in said hole to prevent movement of said cover from said covering position, said outer end of the pin being accessible through said opening upon removal of said positioning means to permit urging of said locking pin axially inwardly to dispose said inner end inwardly of said cover thereby freeing said cover for movement on said mounting means to said exposing position.

2. The machine structure of claim 1 wherein said machine comprises a vehicle having a radiator and said cover comprises a radiator guard.

3. The machine structure of claim 1 wherein said mounting means comprises pivot means for swingably mounting the cover to the support.

4. The machine structure of claim 1 wherein said positioning means comprises threaded means.

5. The machine structure of claim 1 wherein said positioning means comprises means removably carried by the support.

6. The machine structure of claim 1 further including cooperating means on said locking pin and support for preventing rotation of the locking pin about its longitudinal axis.

7. In a machine having a support, a cover, and mounting means movably mounting the cover to the support for selective disposition in a covering position overlying said support and an exposing position, improved means for releasably locking the cover to the support in said covering position comprising:
 a locking pin defining inner and outer ends;
 means on said support defining a hole axially movably receiving said locking pin;
 means on said cover defining an opening aligned with said hole when said cover is in said covering position; and
 positioning means having a manipulating portion removably carried by said cover and a threaded portion removably threaded coaxially to said outer end of the locking pin for selectively urging said locking pin axially outwardly to dispose said locking pin outer end in said opening while maintaining said locking pin inner end in said hole to prevent movement of said cover from said covering position, said outer end of the pin being accessible through said opening upon removal of said positioning means to permit urging of said locking pin axially inwardly to dispose said inner end inwardly of said cover thereby freeing said cover for movement on said mounting means to said exposing position.

8. The machine structure of claim 7 wherein said positioning means comprises a bolt, said manipulating portion comprising the head of said bolt.

9. The machine structure of claim 7 wherein said cover is provided with a counterbore outwardly of said opening, said positioning means includes a washer received in said counterbore and removably engaged by said manipulating portion, said washer defining a reaction member against which said manipulating portion of the positioning means acts during the outward urging of said locking pin by said positioning means.

10. The machine structure of claim 7 further including means for preventing rotation of said locking pin in said hole during the threading of said positioning means relative to said locking pin.

11. The machine structure of claim 7 wherein said hole comprises a through bore.

12. The machine structure of claim 7 wherein said hole comprises a through bore and means are removably mounted to said support at the inner end of said through bore for preventing rotation of said locking pin in said hole during the threading of said positioning means relative to said locking pin.

* * * * *

UNITED STATES PATENT AND TRADEMARK OFFICE
CERTIFICATE OF CORRECTION

PATENT NO. : 4,092,074
DATED : May 30, 1978
INVENTOR(S) : Robert W. Harper and Robert L. Shelby It is certified that error appears in the above-identified patent and that said Letters Patent are hereby corrected as shown below:

Column 2, line 57, after "and" cancel "guard" and substitute therefor --fan--.

Column 4, line 52 (Cl. 1) after "said" cancel "inner" and substitute therefor --outer--.

Column 5, line 26, (Cl. 7) after "said" cancel "inner" and substitute therefor --outer--.

Signed and Sealed this

Sixth Day of May 1980

[SEAL]

Attest:

SIDNEY A. DIAMOND

Attesting Officer

Commissioner of Patents and Trademarks